United States Patent
Jones

[11] Patent Number: 6,044,729
[45] Date of Patent: Apr. 4, 2000

[54] POWERED LUG WRENCH WITH ADJUSTABLE STABILIZING BAR

[76] Inventor: James R. Jones, 1301 Lia Hills Rd., Norcross, Ga. 30071

[21] Appl. No.: 09/149,496

[22] Filed: Sep. 8, 1998

[51] Int. Cl.[7] .................................................. B25B 17/00
[52] U.S. Cl. ........................ 81/57.14; 81/462; 81/180.1
[58] Field of Search .............. 81/54–57, 57.11, 81/57.14, 57.24, 57.3, 57.4, 180.1, 462; DIG. 1

[56] References Cited

U.S. PATENT DOCUMENTS

| | | | |
|---|---|---|---|
| 2,011,070 | 8/1935 | Mooter | 81/54 |
| 4,462,282 | 7/1984 | Biek | 81/57.11 |
| 4,485,698 | 12/1984 | Adman et al. | 81/57.11 |
| 4,920,831 | 5/1990 | Huang | 81/57.14 |
| 5,085,407 | 2/1992 | Lonon | 254/103 |
| 5,176,047 | 1/1993 | Bai et al. | 81/57.24 |
| 5,412,546 | 5/1995 | Huang | 362/119 |
| 5,490,439 | 2/1996 | Matsumura et al. | 81/469 |
| 5,496,014 | 3/1996 | Hsu | 254/122 |

*Primary Examiner*—James G. Smith
*Assistant Examiner*—David B. Thomas
*Attorney, Agent, or Firm*—Joseph N. Breaux

[57] ABSTRACT

A powered lug wrench with adjustable stabilizing bar that is adjustably positionable to contact the roadbed and provide the necessary resistance to the turning of the powered wrench to undo the lug nuts from the lugs. The wrench includes a lug nut drive assembly and an adjustable stabilizing bar assembly. The adjustable stabilizing bar assembly includes a rigid stabilizing bar, a bar fitting rigidly attached to the rigid housing assembly and a knurled stabilizing bar lock screw. The bar fitting has a bar receiving passageway formed entirely therethrough sized to slidably receive the rigid stabilizing bar and a threaded lock screw aperture formed between a top surface of the bar fitting and the bar receiving passageway. The knurled stabilizing bar lock screw is companionately threaded to screw through the threaded lock screw aperture and into the bar receiving passageway to lock the stabilizing bar at a desired length.

1 Claim, 2 Drawing Sheets

POWERED LUG WRENCH WITH ADJUSTABLE STABILIZING BAR

TECHNICAL FIELD

The present invention relates to powered lug wrenches for removing the lug nuts from a vehicle and more particularly to a powered lug wrench with an adjustable stabilizing bar that is extendable sufficiently from a lug nut drive assembly to contact a roadbed surface and thereby provide the necessary resistance to the torque generated by the drive motor of the lug nut drive assembly to remove a lug nut; the powered lug wrench with adjustable stabilizing bar including a lug nut drive assembly and an adjustable stabilizing bar assembly; the lug nut drive assembly including a drive motor, a power cord in electrical connection between the drive motor and a cigarette light adapter plug, and an adjustable stabilizing bar assembly; the lug nut drive assembly including a rigid housing assembly, an electrical drive motor affixed to the rigid housing assembly and having a rotatable geared output shaft, a reduction gear assembly in driven connection with the geared output shaft, and a combination drive gear and lug nut socket rotatably mounted to the rigid housing assembly and in driven connection with the reduction gear assembly; the combination drive gear and lug nut socket being rotatably mounted to a gear securing pin that extends away from an inner wall of the rigid housing assembly through pin aperture formed through a planar bottom of the combination drive gear and lug nut socket; the gear securing pin having a circumferential snap ring groove provided around the tip end of thereof for receiving a retaining ring snap sized to rotatably secure the combination drive gear and lug nut on the gear securing pin; the adjustable stabilizing bar assembly including a rigid stabilizing bar, a bar fitting rigidly attached to the rigid housing assembly and a knurled stabilizing bar lock screw; the bar fitting having a bar receiving passageway formed entirely therethrough sized to slidably receive the rigid stabilizing bar and a threaded lock screw aperture formed between a top surface of the bar fitting and the bar receiving passageway; the knurled stabilizing bar lock screw being companionately threaded to screw through the threaded lock screw aperture and into the bar receiving passageway to lock the stabilizing bar at a desired length.

BACKGROUND ART

It is difficult or impossible for some individuals to use a conventional lug wrench to remove the lug nuts from a vehicle wheel assembly. It would be a benefit to theses individuals to have a powered lug wrench that could be powered by the vehicle battery. Although powered lug wrenches can be used by some individuals, some individuals cannot grip the powered wrench with sufficient strength to provide the necessary resistance to the turning of the powered wrench to undo the lug nuts from the lugs. It would, therefore, be a benefit to have a powered lug wrench that included a stabilizing assembly that could be adjusted to contact the roadbed to generate the necessary resistance to the turning of the powered wrench to undo the lug nuts from the lugs.

GENERAL SUMMARY DISCUSSION OF INVENTION

It is thus an object of the invention to provide a powered lug wrench with adjustable stabilizing bar that is adjustably positionable to contact the roadbed and provide the necessary resistance to the turning of the powered wrench to undo the lug nuts from the lugs.

It is a further object of the invention to provide a powered lug wrench with adjustable stabilizing bar that includes a lug nut drive assembly and an adjustable stabilizing bar assembly; the lug nut drive assembly including a drive motor, a power cord in electrical connection between the drive motor and a cigarette light adapter plug, and an adjustable stabilizing bar assembly; the lug nut drive assembly including a rigid housing assembly, an electrical drive motor affixed to the rigid housing assembly and having a rotatable geared output shaft, a reduction gear assembly in driven connection with the geared output shaft, and a combination drive gear and lug nut socket rotatably mounted to the rigid housing assembly and in driven connection with the reduction gear assembly; the combination drive gear and lug nut socket being rotatably mounted to a gear securing pin that extends away from an inner wall of the rigid housing assembly through pin aperture formed through a planar bottom of the combination drive gear and lug nut socket; the gear securing pin having a circumferential snap ring groove provided around the tip end of thereof for receiving a retaining ring snap sized to rotatably secure the combination drive gear and lug nut on the gear securing pin; the adjustable stabilizing bar assembly including a rigid stabilizing bar, a bar fitting rigidly attached to the rigid housing assembly and a knurled stabilizing bar lock screw; the bar fitting having a bar receiving passageway formed entirely therethrough sized to slidably receive the rigid stabilizing bar and a threaded lock screw aperture formed between a top surface of the bar fitting and the bar receiving passageway; the knurled stabilizing bar lock screw being companionately threaded to screw through the threaded lock screw aperture and into the bar receiving passageway to lock the stabilizing bar at a desired length.

It is a still further object of the invention to provide a powered lug wrench with adjustable stabilizing bar that accomplishes both of the above objects in combination.

Accordingly, a powered lug wrench with adjustable stabilizing bar is provided. The powered lug wrench with adjustable stabilizing bar includes a lug nut drive assembly and an adjustable stabilizing bar assembly; the lug nut drive assembly including a drive motor, a power cord in electrical connection between the drive motor and a cigarette light adapter plug, and an adjustable stabilizing bar assembly; the lug nut drive assembly including a rigid housing assembly, an electrical drive motor affixed to the rigid housing assembly and having a rotatable geared output shaft, a reduction gear assembly in driven connection with the geared output shaft, and a combination drive gear and lug nut socket rotatably mounted to the rigid housing assembly and in driven connection with the reduction gear assembly; the combination drive gear and lug nut socket being rotatably mounted to a gear securing pin that extends away from an inner wall of the rigid housing assembly through pin aperture formed through a planar bottom of the combination drive gear and lug nut socket; the gear securing pin having a circumferential snap ring groove provided around the tip end of thereof for receiving a retaining ring snap sized to rotatably secure the combination drive gear and lug nut on the gear securing pin; the adjustable stabilizing bar assembly including a rigid stabilizing bar, a bar fitting rigidly attached to the rigid housing assembly and a knurled stabilizing bar lock screw; the bar fitting having a bar receiving passageway formed entirely therethrough sized to slidably receive the rigid stabilizing bar and a threaded lock screw aperture formed between a top surface of the bar fitting and the bar receiving passageway; the knurled stabilizing bar lock screw being companionately threaded to screw through the threaded lock screw aperture and into the bar receiving passageway to lock the stabilizing bar at a desired length.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein.

EXEMPLARY MODE FOR CARRYING OUT THE INVENTION

Figure 1:
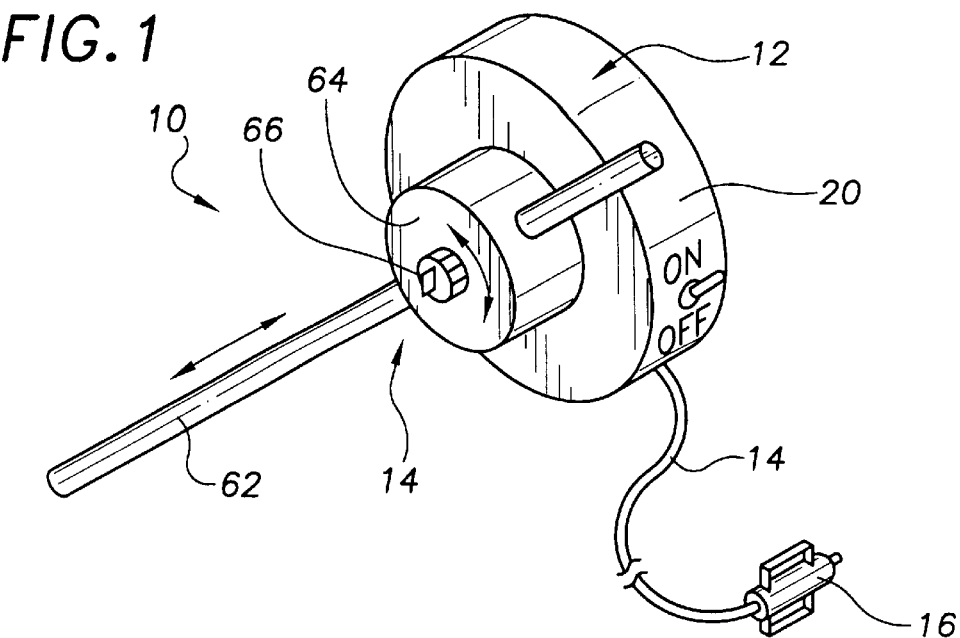
FIG. 1 is a perspective view of an exemplary embodiment of the powered lug wrench with adjustable stabilizing bar of the present invention showing the lug nut drive assembly; the power cord with the cigarette light adapter plug; and the adjustable stabilizing bar assembly including the stabilizing bar, the bar fitting and the knurled stabilizing bar lock screw.
Figure 2:
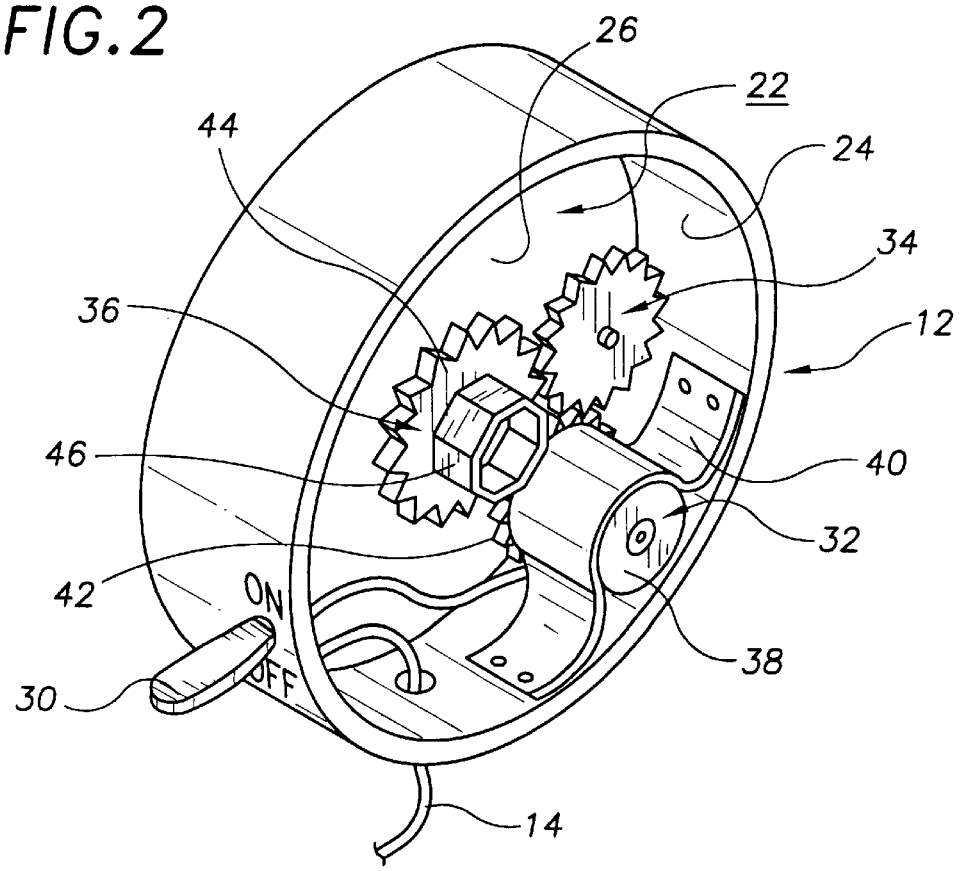
FIG. 2 is a perspective view of the back side of the lug nut drive assembly including the housing assembly, the on/off switch, the electrical drive motor, the reduction gear assembly and the combination drive gear and lug nut socket.

FIG. 1 shows an exemplary embodiment of the powered lug wrench with adjustable stabilizing bar of the present invention generally designated 10. Lug wrench 10 includes a lug nut drive assembly, generally designated 12; a power cord 14 with a cigarette light adapter plug 16; and an adjustable stabilizing bar assembly, generally designated 18. Lug nut drive assembly 12 includes a cylinder shaped metal housing assembly 20, referring now to FIG. 2, having a drive component cavity 22 formed in the back thereof that is defined by an inner perimeter wall 24 and an inner back surface 26. Lug nut drive assembly 12 also includes an on/off switch 30; an electrical drive motor, generally designated 32; a reduction gear assembly, generally designated 34; and a combination drive gear and lug nut socket, generally designated 36.

Electrical drive motor 32 has a housing 38 affixed to inner perimeter wall 24 by a bracket 40 and a geared output shaft 42 in meshed relationship with reduction gear assembly 34. Reduction gear assembly 34 is a single gear rotatably mounted to inner back surface 26 in meshing relationship with geared output shaft 42 and a socket gear 44 of combination drive gear and lug nut socket 36. Socket gear 44 is integrally molded with a lug nut socket 46. Socket gear 44 and lug nut socket 46 are concentrically oriented.

Figure 3:
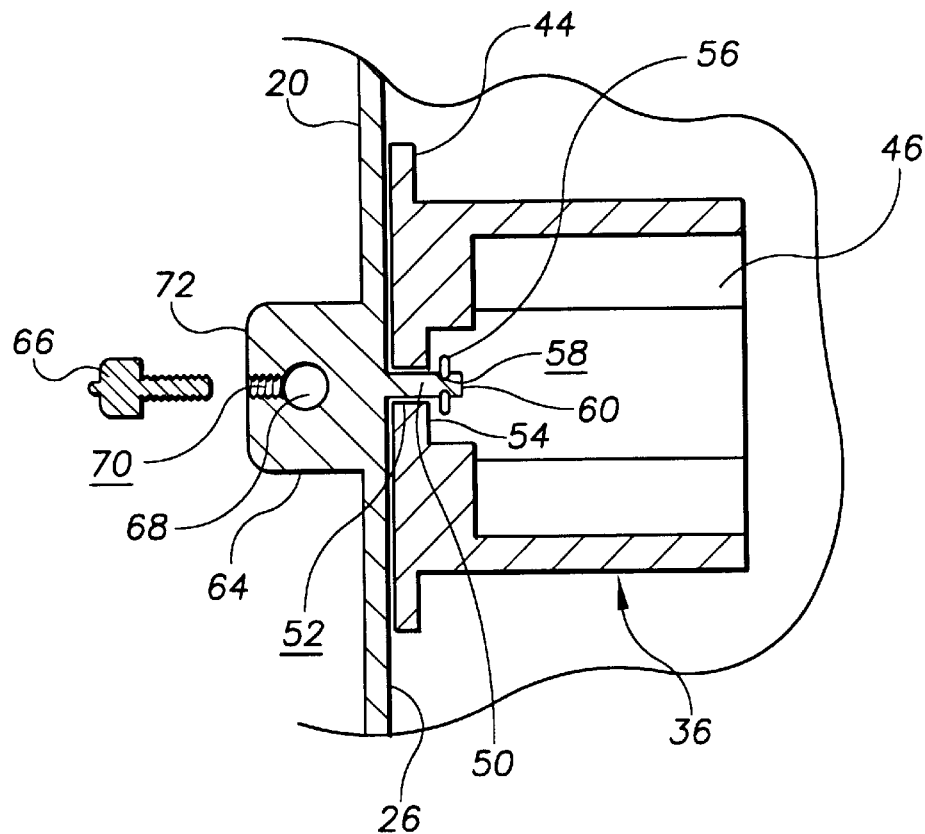
FIG. 3 is a partial sectional view of the combination drive gear and lug nut socket showing the gear securing pin extending away from the inner wall of the housing assembly and positioned through the pin aperture of the combination drive gear and lug nut socket; the retaining ring snap fit into the circumferential snap ring groove provided around the tip end of the gear securing pin rotatably securing the combination drive gear and lug nut on the gear securing pin; the bar receiving passageway formed through the bar fitting; the threaded lock screw aperture formed between the top surface of the bar fitting and the bar receiving passageway; and the knurled stabilizing bar lock screw companionately threaded to screw into the threaded lock screw aperture and lock the stabilizing bar at a desired length.

Referring to FIG. 3, combination drive gear and lug nut socket 36 is rotatably mounted to inner back surface 26 of rigid housing assembly 20 by a gear securing pin 50 that extends outwardly from inner back surface 26 and through a pin aperture 52 formed through a planar bottom 54 of combination drive gear and lug nut socket 36; and a retaining snap ring 56 that snap fits into a circumferential snap ring groove 58 provided around a tip end 60 of gear securing pin 50.

Figure 4:
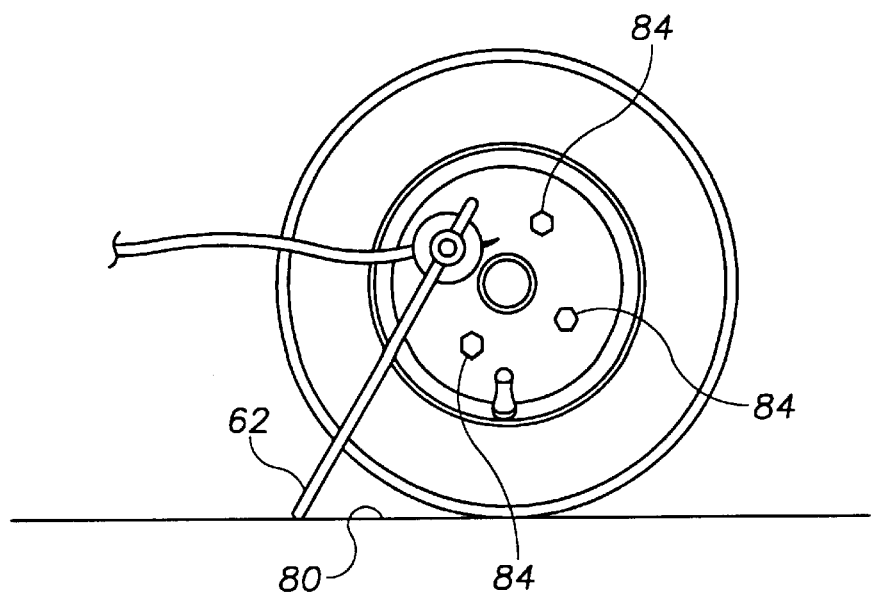
FIG. 4 is a side plan view of the exemplary powered lug wrench with adjustable stabilizing bar of FIG. 1 in use with the lug nut of a representative vehicle wheel showing the adjustable stabilizing bar assembly configured with the stabilizing bar extended to contact the road surface and thereby provide the necessary resistance to the torque generated by the electrical drive motor to remove the lug nut.

With reference back to FIG. 1, adjustable stabilizing bar assembly 14 includes a rigid metal stabilizing bar 62, a cylinder shaped bar fitting 64, and a knurled stabilizing bar lock screw 66. Referring to FIG. 3, bar fitting 64 is integrally formed with housing assembly 20 and includes a bar receiving passageway 68, formed entirely radially therethrough that is sized to slidably receive rigid stabilizing bar 62 (FIG. 1), and a threaded lock screw aperture 70 formed between a top surface 72 of bar fitting 64 and bar receiving passageway 68. Knurled stabilizing bar lock screw 66 is companionately threaded to screw through the threaded lock screw aperture 70 and into bar receiving passageway 68 to, referring now to FIG. 4, lock stabilizing bar 62 at a desired length to contact a roadbed 80 and provide the necessary resistance to the torque generated by electrical drive motor 32 (FIG. 2) to remove lug nuts 84.

It can be seen from the preceding description that a powered lug wrench with adjustable stabilizing bar has been provided that includes an adjustable stabilizing bar that is adjustably positionable to contact the roadbed and provide the necessary resistance to the turning of the powered wrench to undo the lug nuts from the lugs; and that includes a lug nut drive assembly and an adjustable stabilizing bar assembly; the lug nut drive assembly including a drive motor, a power cord in electrical connection between the drive motor and a cigarette light adapter plug, and an adjustable stabilizing bar assembly; the lug nut drive assembly including a rigid housing assembly, an electrical drive motor affixed to the rigid housing assembly and having a rotatable geared output shaft, a reduction gear assembly in driven connection with the geared output shaft, and a combination drive gear and lug nut socket rotatably mounted to the rigid housing assembly and in driven connection with the reduction gear assembly; the combination drive gear and lug nut socket being rotatably mounted to a gear securing pin that extends away from an inner wall of the rigid housing assembly through pin aperture formed through a planar bottom of the combination drive gear and lug nut socket; the gear securing pin having a circumferential snap ring groove provided around the tip end of thereof for receiving a retaining ring snap sized to rotatably secure the combination drive gear and lug nut on the gear securing pin; the adjustable stabilizing bar assembly including a rigid stabilizing bar, a bar fitting rigidly attached to the rigid housing assembly and a knurled stabilizing bar lock screw; the bar fitting having a bar receiving passageway formed entirely therethrough sized to slidably receive the rigid stabilizing bar and a threaded lock screw aperture formed between a top surface of the bar fitting and the bar receiving passageway; the knurled stabilizing bar lock screw being companionately threaded to screw through the threaded lock screw aperture and into the bar receiving passageway to lock the stabilizing bar at a desired length.

It is noted that the embodiment of the powered lug wrench with adjustable stabilizing bar described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A powered lug wrench with adjustable stabilizing bar comprising:

a lug nut drive assembly and an adjustable stabilizing bar assembly;

said lug nut drive assembly including a drive motor, a power cord in electrical connection between said drive motor and a cigarette light adapter plug, and an adjustable stabilizing bar assembly;

said lug nut drive assembly including a rigid housing assembly, an electrical drive motor affixed to said rigid housing assembly and having a rotatable geared output shaft, a reduction gear assembly in driven connection with said geared output shaft, and a combination drive gear and lug nut socket rotatably mounted to said rigid housing assembly and in driven connection with said reduction gear assembly;

said combination drive gear and lug nut socket being rotatably mounted to a gear securing pin that extends away from an inner wall of said rigid housing assembly through pin aperture formed through a planar bottom of said combination drive gear and lug nut socket;

said gear securing pin having a circumferential snap ring groove provided around a tip end of thereof for receiving a retaining snap ring sized to rotatably secure said combination drive gear and lug nut socket on said gear securing pin;

said adjustable stabilizing bar assembly including a rigid stabilizing bar, a bar fitting rigidly attached to said rigid housing assembly and a stabilizing bar lock screw;

said bar fitting having a bar receiving passageway formed entirely therethrough sized to slidably receive said rigid stabilizing bar and a threaded lock screw aperture formed between a top surface of said bar fitting and said bar receiving passageway;

said stabilizing bar lock screw being companionately threaded to screw through said threaded lock screw aperture and into said bar receiving passageway to lock said stabilizing bar at a desired length.

* * * * *